United States Patent Office 3,679,434
Patented July 25, 1972

3,679,434
METHOD OF PREPARING FRESH UNCURED MEAT PRODUCTS
John C. Bard, Monona, and Floyd C. Olson, Madison, Wis., assignors to Oscar Mayer & Co., Inc., Madison, Wis.
No Drawing. Filed July 13, 1970, Ser. No. 54,566
Int. Cl. A22c 18/00
U.S. Cl. 99—107           6 Claims

ABSTRACT OF THE DISCLOSURE

Bodies of cooked fresh meat of predetermined uniform size, shape and weight suitable for slicing are made from lean primal cuts or lean chunks of whole (unground) uncooked, fresh (uncured) meat with at least a substanial portion of the chunks weighing at least about one-half pound a piece and at least in places having a minimum thickness of about one inch. Such primal cuts or chunks are injected with a solution of edible polyphosphate salt prior to being mechanically worked until a tacky exudate develops on the meat surfaces. The mechanically worked primal cuts or chunks are pressed together to form consolidated meat bodies of predetermined uniform size, shape and weight suitable for cooking. Injection of the salt furnishing the polyphosphate ions, as distinguished from surface treatment therewith, prevents, or at least substantially reduces and retards, the rancidity which otherwise would quickly develop in the cooked fresh meat bodies on cooling.

---

This invention relates, generally, to innovations and improvements in preparing bodies, e.g. roasts, of whole cooked fresh meat of predetermined uniform size, shape and weight suitable for slicing, characterized by their resistance to the rancidity which normally develops in such bodies on cooling after cooking.

More particularly, the invention relates to forming meat bodies of cooked fresh meat of the class described from lean primal cuts or lean chunks of uncooked fresh meat with at least a substantial portion of the chunks weighing at least about one-half pound each and at least in part having a thickness of at least about one inch, which primal cuts or chunks are mechanically worked to develop tacky exudate on the surfaces thereof which unites the primal cuts or chunks when they are pressed or molded together into bodies of desired size, shape and weight and then cooked. In the foregoing known procedure we introduce the novel step of injecting such primal cuts or chunks with a source of polyphosphate ions with the result that in the cooked bodies or roasts the polyphosphate ions are distributed substantially uniformly throughout the meat bodies and serve to prevent the cooked meat from becoming rancid on cooling.

There is a substantial and growing market demand for bodies or roasts of whole (unground) fresh (uncured) meat of uniform predetermined size, shape and weight which upon cooking can be thinly sliced into slices of uniform shape and size. For example, drive-in restaurants specializing in serving of sliced roast beef are becoming increasingly popular. It is highly desirable for these establishments to be supplied with meat roasts of uniform size, shape and weight for slicing which may be cooked on the premises or pre-cooked in a commissary and heated on the premises.

It will be apparent that there is also a demand for such meat roasts suitable for slicing in the restaurant field generally, including institution dining rooms as well as in the home.

Maas Patent 3,076,713 discloses a commercially successful method of making consolidated loaves or bodies of fresh uncurred meat of uniform size, shape and weight from lean primal cuts or chunks of lean meat weighing at least about one-half pound each. In the process of the Maas patent lean primal cuts or chunks weighing about at least one-half pound each are mechanically worked, usually in the presence of salt, until the pieces become limp and pliable and a tacky exudate develops on the meat surfaces. When this condition has developed, the primal cuts or chunks may be pressed together such as by stuffing into forms of desired shape and size. The tacky exudate will bond the uncooked pieces or chunks of meat together into an integral mass and the bonds become even stronger and more permanent on cooking. The pressed and shaped bodies may be cooked directly preferably within approximately one hour after the mechanical working operation is terminated or they may be frozen and held to a future time for cooking. In either case the cooked bodies or roasts can be thinly sliced and the slices do not come apart or break up along the lines of the individual primal cuts or chunks.

Products on the market made in accordance with principles of the Maas patent are customarily labeled or referred to as "Sectioned and Formed." The principles of the Maas process have been used extensively in the production of sectioned and formed poultry loaves (e.g. turkey logs) and cured smoked ham products. However, the Maas patent also teaches the production of sectioned and formed fresh meat roasts in uniform sizes, shapes and weights from fresh pork, beef, veal, mutton and mixtures thereof. While fresh meat roasts formed in accordance with the Maas patent have excellent quality, when they are cooled after cooking rancidity rapidly develops therein and detracts from the flavor and taste qualities thereof. The inherent tendency of cooked fresh uncured meats generally to develop rancidity quickly after cooling has been known for a considerable time. For example, it was reported on by Tims and Watts, Protection of Cooked Meats with Phosphates, Food Technology 12: pp. 240–243 (1958).

It was discovered in accordance with the present invention that when primal cuts or chunks of lean fresh meat weighing at least about one-half pound each and at least in places having a thickness of one inch or more were processed into roasts or loaves in accordance with disclosure of the Maas patent and cooked, the primal cuts or chunks having been injected with edible polyphosphate salt prior to being mechanically worked, that development of rancidity on cooling the cooked roasts or loaves was either prevented or substantially reduced and retarded.

Prior to the present invention it was not the practice to inject fresh primal cuts or fresh chunks of meat with polyphosphate salts prior to working them in accordance with the Maas procedure unless the polyphosphate was a component of a curing solution or pickle. Rather, when salts were used in making consolidated bodies of fresh meat in accordance with the Maas process they were applied only to the surfaces of the fresh uncooked primal cuts and chunks.

Accordingly, the object of the present invention generally stated is the improvement in the method of preparing sectioned and formed fresh meat loaves or roasts of uniform size, dimension and weight in accordance with the process of Maas Patent 3,076,713 wherein the individual primal cuts or chunks of lean fresh uncured meat weighing at least about one-half pound each are injected with appropriate quantities of edible polyphosphate salts so as to prevent the development of rancidity in such roasts or loaves on cooling after being cooked.

Certain other objects of the invention will in part be obvious and will in part appear hereinafter.

It has been established that polyphosphate ions act and may be used as antioxidants to prevent or suppress the rancidity that quickly develops in cooked fresh meats. It has been further established in accordance with this invention that when applied only to the exteriors of chunks or pieces of fresh meat weighing at least about one-half pound and of substantial thickness (i.e., one inch and greater) the polyphosphate ions, as distinguished from sodium chloride, will not penetrate during the course of the Maas mixing process, into the centers of such pieces or chunks in sufficient amounts to prevent or materially suppress such rancidity. On the other hand, when the chunks or pieces of fresh meat are substantially smaller, e.g. weight being one quarter pound or less, or are substantially thinner, i.e. under one inch, the polyphosphate ions within the course of the Maas mixing process, penetrate such smaller chunks or pieces in sufficient amounts to prevent or adequately suppress rancidity.

When carrying out the process of this invention using a mixture of larger and smaller chunks of fresh meat it will suffice to inject only the larger chunks or pieces of fresh meat that weigh one-half pound or more and have places that are at least about one inch thick with polyphosphate ions while applying the sources of polyphosphate ions to the exteriors of the smaller chunks. However, as a practical matter, the presently preferred procedure is to subject all of the chunks or pieces regardless of size to injection using known commercially available apparatus of the multiple needle type used to inject or "pump" meat with curing solution or pickle.

For a more complete understanding of the nature and scope of the present invention reference may now be had to the following detailed description thereof wherein illustrative working examples are set forth to acquaint those skilled in the art with referred embodiments of the invention and to suggest other embodiments whereby the invention may be practiced.

As used herein "primal cut" refers to a body or piece of whole, unground, fresh meat such as ham, shoulder, loin, etc., or a section thereof usually weighing more than one-half pound and being over one-inch thick.

EXAMPLE I

Method

Two methods were used in preparing 4 to 7 pound beef roasts for cooking.

In Method #1 a dry mix consisting of salt and sodium tripolyphosphate was used.

In Method #2 an injection solution consisting of water, salt and sodium tripolyphosphate was used.

Code (A) Lean beef chunks (½#–2#) tumble mixed with dry mix then cooked immediately.

(B) Lean beef chunks (½#–2#) tumble mixed with dry mix, held 96 hours then cooked.

(C) Lean beef chunks (½#–2#) spray pumped with injection solution tumble mixed and then cooked immediately.

(D) Lean beef chunks (½#–2#) spray pumped with injection solution tumble mixed, held for 96 hours then cooked.

Injection solution formula: Percent
Water ---------------------------------- 82.76
Salt (NaCl) ---------------------------- 10.34
Sodium tripolyphosphate ---------------- 6.90

Formula for Method #1—Codes A and B
 Beef Chunks—100%
 Salt (NaCl)—1.5% of meat wt.
 Sodium Tripolyphosphate—0.5% of meat wt.

Formula for Method #2—Codes C and D
 Beef Chunks—100%
 Injection Solution—7¼% of meat wt.

Procedure for Codes A and B

The beef chunks were placed in a large polyethylene bag with salt and sodium tripolyphosphate; then bag was securely tied. Beef chunks and dry mix were tumble-mixed for 30 minutes in a churn mixer.

Code A.—Mixed beef chunks were stuffed into a large fibrous casing and cooked in 155° F. water to an internal temperature of 150° F. Product was chilled in cold running water for 1 hour then held in a 32° F. cooler for 16 hours.

Code B.—Mixed beef chunks were held in a 32° F. cooler for 96 hours; then stuffed, cooked and chilled same as Code A.

Procedure for Codes C and D

Chunks of beef were pumped or injected to 107¼% of meat weight with injection solution. Pumped beef chunks were placed in a large polyethylene bag. Bag was securely tied. Beef chunks were tumble mixed for 30 minutes in a churn mixer.

Code C.—Mixed beef chunks were stuffed into a large fibrous casing and cooked 155° F. water to an internal temperature of 150° F. Product was chilled in cold running water for an hour then held in a 32° F. cooler for 16 hours.

Code D.—Mixed, pumped beef chunks were held in a 32° F. cooler for 96 hours; then stuffed, cooked and chilled same as Code C.

Results

Samples were taken for analysis as follows: Cooked beef chunks, Codes A, B, C and D were cut removing the outside edge of the cooked beef 1 inch in depth and labeled Edge. The center part of each chunk of cooked beef was labeled Center.

| Chemical analysis | Percent | | | TBA |
|---|---|---|---|---|
| | Salt | Phosphorus | Increase in phosphorus | |
| Code A center | 0.1 | 0.223 | 0.009 | 3.2 |
| Code A edge | 0.3 | 0.227 | 0.013 | 3.3 |
| Code B center | 0.7 | 0.218 | 0.004 | 3.3 |
| Code B edge | 1.1 | 0.304 | 0.090 | 3.3 |
| Code C center | 0.8 | 0.377 | 0.163 | 1.9 |
| Code C edge | 0.7 | 0.257 | 0.043 | 2.0 |
| Code D center | 1.4 | 0.384 | 0.170 | 3.5 |
| Code D edge | 1.2 | 0.305 | 0.090 | 4.0 |
| Fresh beef chunk | | 0.214 | | |

Conclusions

Pumping beef chunks and cooking immediately (Code C) is the best method of preparing beef for a cooked fresh meat product. The increase in percent phosphorous at the center of the uncured cooked roasts from Code C was 18 times greater than the increase in the corresponding uncured cooked roasts Code A, showing the necessity and effectiveness of injecting the phosphate solution. TBA readings at center and edge of cooked beef Code C are substantially lower than corresponding readings from cooked beef Codes A, B and D showing the effectiveness of the injected phosphate solution in preventing or suppressing rancidity.

EXAMPLE II

Beef roast

A mixture of sections of beef cuts (clods, chuck rolls, top butts, Scotch rolls, knuckles and boneless strip loin) were trimmed to remove most of the fat, cords, fell and back straps. The trimmed primal cuts were cut into chunks weighing from about ½ lb. to about 2 lbs. each and having a thickness in excess of one inch. Ground uncooked fatty fresh meat in the form of blended trimmings analyzing approximately 50% fat were used in the following formula with the exception of the back straps:

| | Parts by weight |
|---|---|
| Trimmed beef chunks | 85 |
| Beef trimmings (50% fat) | 15 |
| Injection solution | 7.25 |
| Salt (NaCl) | 0.75 |
| Spice | 0.40 |

The injection solution had the following composition:

| | Percent by weight |
|---|---|
| Water | 82.76 |
| Salt | 10.34 |
| Sodium tripolyphosphate | 6.90 |

Procedure: The trimmed beef chunks (½# to 2# in size) and the 50% beef trimmings were chilled to 28–30° F. The chilled beef chunks were spray pumped (i.e. injected) in known manner with the injection solution to 107¼% of the meat formulation weight. The 50% beef trimmings were ground through a 1/16" plate (i.e. 1/16" diameter openings in the plate). The injected or pumped lean beef chunks, ground 50% beef trimmings, ¾% salt and 4/10% spice were placed in a stainless steel mixer of known type equipped with paddles and mixed without vacuum for 5 minutes and then under 28" vacuum for 5 minutes.

The mixed batch was removed from the mixer and stuffed into 4 3/16" x 4 3/16" x 34" polyethylene lined forms and a spring loaded cover was placed on each form. The stuffed product was processed in water at 155° F. until the loaves reached an internal temperature of 150° F. This required a cook time of about 4½ hours. The loaves were chilled in cold running water to internal temperatures of 75–90° F. in approximately 1½ hours. The loaves were knocked out of the forms and placed in a 28–32° F. cooler until their internal temperature reached 32–34° F.

Several loaves were cross cut into 4 equal blocks weighing approximately 5#. Each block was placed in a 9" x 18" Cryovac bag and placed in a −20° F. blast freezer for 24 hours and then they were stored in a 0° F. freezer until time for examination.

Other knocked out loaves were chilled to 22° F. internal temperature and sliced on an Anco Slicer 40 slices per inch. A number of 2½ ounce portions of the thin sliced beef were placed in 5⅝" x 7⅝" clear "Boil In" pouches (50 gauge saran coated Mylar plus .002 polyethylene). The filled pouches were vacuum sealed in a Flex Vac closing machine boxed and placed in a −20° F. blast freezer for 24 hours and then stored in a 0° F. freezer until time for examination.

The following results and conclusions based on Example II and the indicated variations thereof are:

(1) Roast beef loaves made from batches that were held 18 hours or more before stuffing showed much higher TBA values than loaves that were stuffed and cooked immediately after mixing.

(2) Roast beef loaves made from meat without pre-chilling at 28–30° F. resulted in substantial cooking shrinks.

(3) Tests were conducted using 5% rework (butt ends of loaves). Flavor, color of sliced surface and appearance of these loaves were satisfactory.

(4) Fibrous casings were used in place of metal forms but meat juice pockets tended to make the products difficult to handle for slicing and packaging.

(5) Several tests were conducted using beef trimmings at levels of 7½, 10, 15, 20 and 30% of the meat formula. Roast beef loaves containing 15% ground trimmings were considered superior to the other loaves on the basis of appearance, texture and cost.

(6) Sodium tripolyphosphate at a level of at least about 0.10% by weight must be distributed throughout the meat to prevent rancidity. In the case of chunks of lean meat weighing at least about ½ pound each this concentration and distribution can only be obtained by injection of a polyphosphate ion solution as distinguished from being worked in from the exterior by mixing or agitating the chunks in the presence of edible polyphosphate salt.

EXAMPLE III

Turkey breast meat loaf

Formula:

| Ingredients: | Pounds |
|---|---|
| Turkey breast meat | 100 |
| Injection solution | 7.225 |
| Salt (NaCl) | 0.25 |

Composition of injection solution:

| | |
|---|---|
| Water (100 gallons) | 833 |
| Salt (NaCl) | 104 |
| Sodium tetrapyrophosphate | 58 |

Manufacture.—The turkey breast meat pieces ranging in weight from 0.25 to 1.5 pounds are injecto pumped to 108.5% of their green weight. Pieces weighing one-half pound or more and one inch or more thick make up most of the weight. The pieces are mixed with the added salt for 10 minutes in paddle mixer without vacuum and 5 minutes with 28" of vacuum.

Stuff the mixed product into polyethylene lined spring loaded stainless steel forms.

Process the product in 166° F. water to an internal temperature of 160° F.

Chill the turkey loaf in circulating cold water (50°/60° F.) to an internal temperature of 82°/90° F.

Remove the cooked turkey from the forms and temper to an internal temperature of 32°/34° F. On slicing, the meat does not break apart and does not become rancid in the normal short period of time.

EXAMPLE IV

Chunked and formed pork

Formula:

| Ingredients: | Pounds |
|---|---|
| Fresh blademeat chunks —95% | 85 |
| Pork trim 50% lean 50% fat | 15 |
| Injection solution | 7.225 |
| Salt (NaCl) | 0.25 |

Composition of injection solution:

| | |
|---|---|
| Water (100 gallons) | 833 |
| Salt (NaCl) | 104 |
| Sodium tetrapyrophosphate | 58 |

Manufacture.—The blademeat chunks weighing one-half pound or more and one inch or more thick are injecto pumped with injection solution to 108.5% green weight.

Grind pork trim through a ⅛ inch plate. Mix pumped blademeat, ground pork trim and salt for 10 minutes in a paddle mixer without vacuum and 5 minutes with 28" of vacuum.

Stuff the mixed product into polyethylene lined, spring loaded stainless steel forms.

Process the product in 166° F. water to an internal temperature of 160° F.

Chill the cooked pork in circulating cold water (50°/60° F.) to an internal temperature of 82°/90° F.

Remove the cooked pork from the forms and temper to an internal temperature of 32°/34° F.

Cut the cooked pork loaves into three parts, each piece weighing approximately 4 to 5 pounds.

Place the loaves in Cryovac bags, draw 28" of vacuum and seal.

Place in a −30° F. blast freezer until the internal temperature is 0° F. and hold at 0° F. until shipped.

Manufacturing yield is 96.5% or original meat weight. The loaves did not become rancid for prolonged periods.

EXAMPLE V

Boneless fresh ham

Boneless fresh hams (fresh leg of pork) weighing 14 pounds each were injecto pumped to 108.5% wtih an injection solution having the same formulation as in Example IV. The pumped hams were churned for about 25 minutes. Each ham became soft and pliable and its surfaces became covered with a tacky exudate. The hams were stuffed into forms; roasted at oven temperatures of 325° F. to internal temperatures of 1970° F. and chilled in circulating water (50°/60°) to an internal temperature of 82°/90° F. The cooked and preformed fresh hams were removed from the forms, tempered to an internal temperature of 32°/34° F. They were then vacuum packaged in Cryovac bags and held in a −30° F. blast freezer until the internal temperatures reached 0° F. Samples of the cooled cooked hams showed they could be thinly sliced and the slices did not develop the usual fast rancidity.

In practicing the invention various edible sodium and potassium salts may be used including the polyphosphate, pyrophosphate, tetrapyrophosphate, hexametaphosphate and tripolyphosphate salts. Desirably the lean chunks or primal cuts are chilled to between about 25 to 32° F. before they are mechanically worked.

We claim:

1. In the method of preparing fresh uncured meat bodies suitable for cooking and slicing wherein lean primal cuts or lean chunks of whole, unground, uncooked fresh meat weighing at least about one-half pound each and being at least about one inch thick are mechanically worked until they become soft and pliable and an appreciable amount of tacky exudate forms on the surfaces thereof, and said primal cuts or chunks with or wtihout smaller mechanically worked pieces are pressed together in said mechanically worked condition to form consolidated meat bodies suitable for cooking before or after freezing, the improvement which consists of injecting said primal cuts or chunks prior to the mechanical working thereof with a sufficient quantity of an edible source of polyphosphate ions with or without sodium chloride in such manner and quantity as to distribute said polyphosphate ions throughout the meat on said mechanical working and thereby substantially reduce the rancidity which normally quickly develops in cooked fresh meat bodies on cooling.

2. In the improved method of claim 1, pre-chilling said chunks or primal cuts to from about 25 to about 32° F. prior to said mechanical working thereof.

3. The improved method of claim 1, wherein the quantity of polyphosphate ions distributed equals at least about 0.10% by weight of the meat.

4. In the improved method of claim 1 incorporating with said lean chunks or lean primal cuts while undergoing said mechanical working from about 7.5 to about 30% by weight of ground uncooked fatty fresh meat based on the total meat.

5. The improved method of claim 1, wherein said edible source of polyphosphate ions is selected from the group consisting of the sodium and potassium salts of polyphosphate, pyrophosphate, tetrapyrophosphate, hexametaphosphate, and tripolyphosphate.

6. The improved method of claim 1, wherein said cooking operation is initiated within approximately one hour after said mechanical working operation is terminated.

References Cited

UNITED STATES PATENTS 3,076,713   2/1963   Maas _____ 99—107

HYMAN LORD, Primary Examiner